Feb. 1, 1966 A. N. SWEENY 3,232,144
ADJUSTABLE TOOL HOLDER
Original Filed July 26, 1960 2 Sheets-Sheet 1
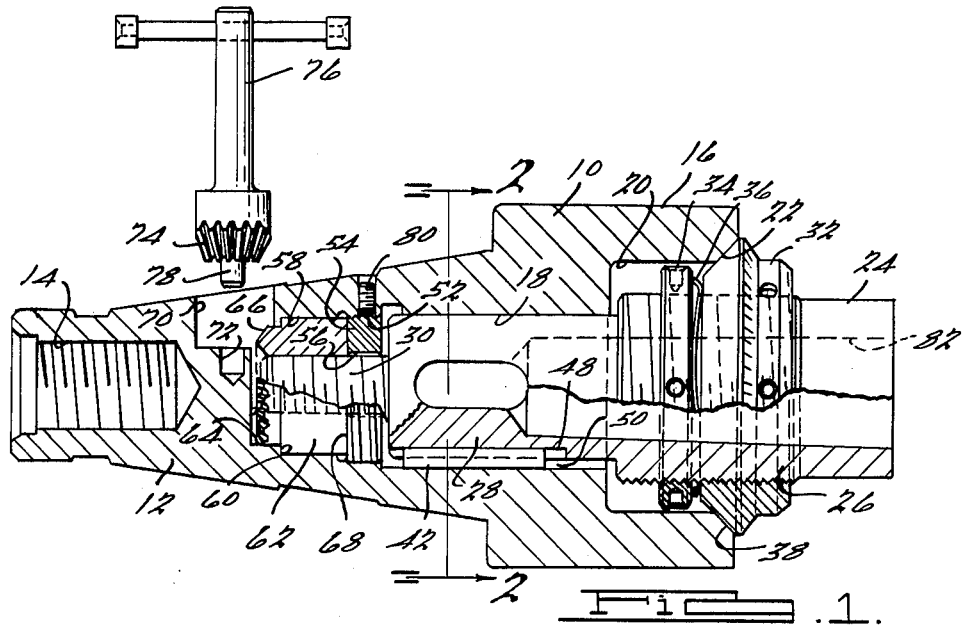
INVENTOR.
Allen N. Sweeny
BY
Barnes, Dickey & Pierce
ATTORNEYS

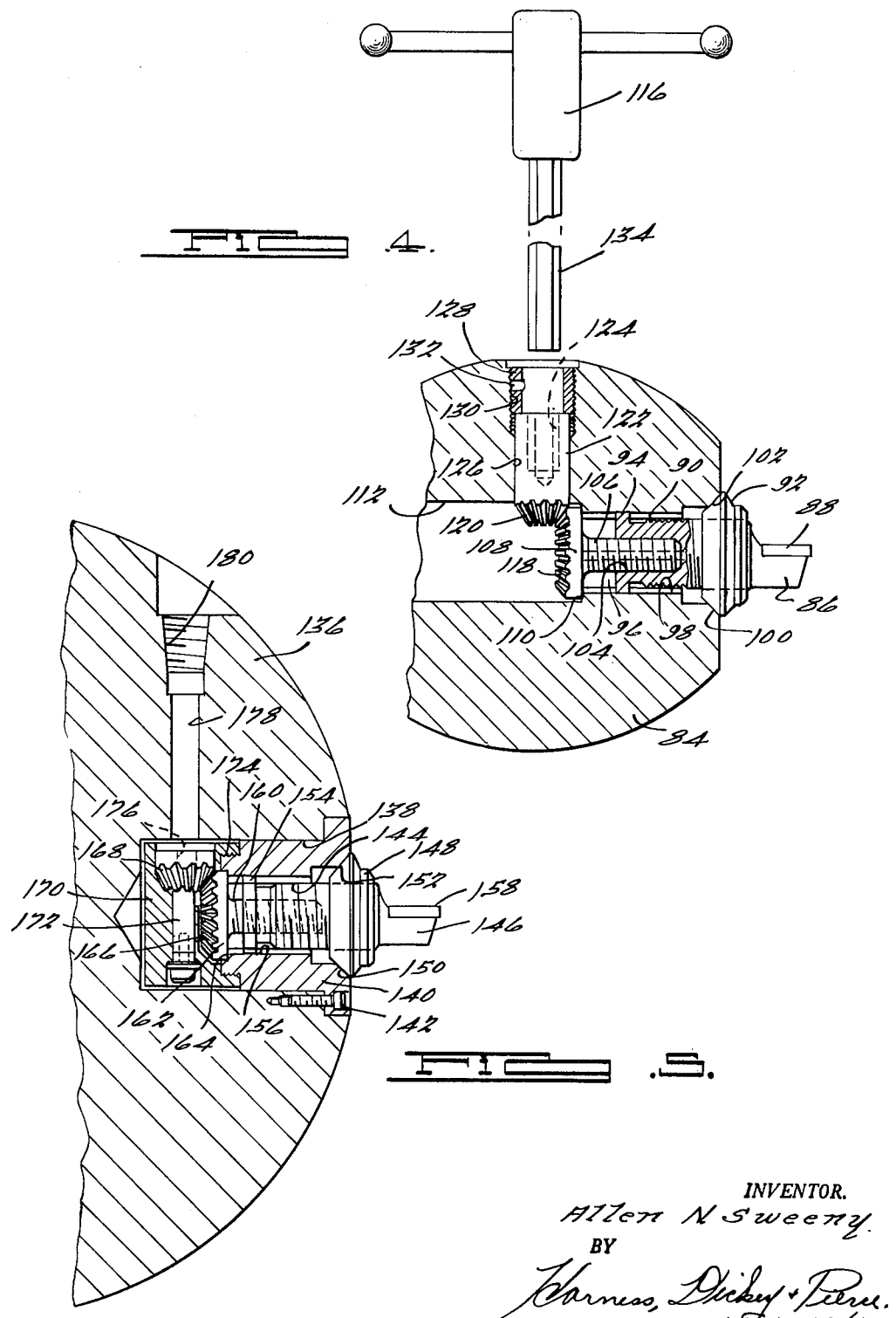

United States Patent Office 3,232,144
Patented Feb. 1, 1966

3,232,144
ADJUSTABLE TOOL HOLDER
Allen N. Sweeny, Grosse Pointe, Mich., assignor to De Vlieg Machine Company, Royal Oak, Mich., a corporation of Michigan
Continuation of abandoned application Ser. No. 45,498, July 26, 1960. This application Oct. 28, 1963, Ser. No. 320,603
1 Claim. (Cl. 77—58)

This application is a continuation of my prior co-pending application, Serial No. 45,498, filed July 26, 1960, and now abandoned.

This invention relates to tool holders for metal cutting tools or the like and more particularly to a locking and retaining mechanism for an adjustable tool supporting body.

It is an object of the present invention to provide a tool assembly of the type incorporating a tool holder and an axially adjustable tool supporting body carried by said tool holder in which the tool supporting body may be conveniently loosened for adjustment and in which tool supporting bodies may be readily interchanged in a tool holder.

It is another object of the present invention to provide a tool locking and retaining structure of the above character which is accessible from a direction perpendicular to the axis of adjustment of the tool body and which does not require the presence of a through bore in the surrounding supporting structure axially rearwardly of the body.

It is still another object of the present invention to provide a tool locking and retaining structure which is rugged in construction, which will accurately maintain the alignment and position of the tool supporting body, which may be conveniently assembled and used, and which is relatively inexpensive of manufacture.

These and other objects and advantages of the present invention will become apparent from the following detailed description taken in conjunction with the accompanying drawings wherein:

FIGURE 1 is a longitudinal sectional view, partly in elevation, of a tool holder assembly and locking wrench embodying the principles of the present invention;

FIG. 2 is a sectional view of the structure illustrated in FIG. 1, taken along the line 2—2 thereof;

FIG. 3 is a side elevational view of a boring head illustrating another embodiment of the present invention;

FIG. 4 is a sectional view of the structure illustrated in FIG. 3, taken along the line 4—4 thereof; and FIG. 5 is a sectional view of structure similarly illustrated in FIG. 4 showing still another embodiment of the present invention.

Referring now to the drawings, FIGURE 1 depicts a tool holder 10 having a tapered shank portion 12 adapted to fit within the drive spindle (not shown) of a machine tool for rotation about its longitudinal axis. The shank portion 12 has a rearwardly open threaded bore 14 for the reception of a locking screw (not shown) which serves to lock the tool holder in the spindle. It will, of course, be appreciated that there are a variety of tapers and shank configurations in current usage for tool holders, boring bars, tool adapters and the like and that the particular configuration of the shank by which the part is held in a machine spindle may be varied without departing from the scope of the present invention.

The tool holder 10 also includes a head portion 16 which is of outwardly cylindrical configuration and which is provided with an elongated axial bore 18 extending rearwardly into the shank portion 12 and having an enlarged counter bore 20 at the forward end thereof. The counter bore 20 has a tapered or beveled bearing surface 22 at its forward end. The tool holder 10 serves to support and carry an adjustable tool supporting body 24 having an enlarged threaded portion 26, a slightly reduced diameter shank portion 28 and a substantially reduced diameter threaded rear terminal portion 30. The shank portion 28 is smoothly but snugly slidable in the tool holder bore 18, while the forward end of the tool supporting body 24 projects forwardly of the tool holder. A positioning or supporting member in the form of a graduated dial member or collar 32 is threaded onto the threaded body portion 26, as is a lock nut 34, with a wave or spring washer 36 interposed therebetween. The dial member 32 has a conical bearing surface 38 which conformably seats against the bearing surface 22 of the tool holder for firmly and rigidly positioning the supporting body 24 in a desired axial position. The wave washer 36 will compress upon adjustment of the dial member 32 to permit limited adjustment of the tool supporting body 24 without resetting the nut 34, while serving to prevent inadvertent or accidental rotation of the dial member 32 on the tool supporting body 24 between the time that it is adjusted and the time that it is locked in position. The shank portion 28 of the tool supporting body 24 has a groove 48 formed therein in which a key member 42 is press fit or otherwise secured, so as to slidably fit within a keyway 50 extending longitudinally along the wall of the bore 18. The key 42 thereby prevents rotation of the tool supporting body 24 relative to the tool holder 10 so that when the dial member 32 is rotated, the tool supporting body will be adjusted on its longitudinal axis.

As may be seen in FIGURE 1, the bore 18 of the tool holder 10 extends rearwardly of the shank portion 28 of the tool supporting body and is of slightly stepped diameter. A portion thereof is threaded at 52 for threaded engagement with an externally threaded, generally disk-shaped or annular abutment member 54 having a central aperture 56 through which the threaded terminal portion 30 freely passes. A portion of the bore 18 rearwardly of the threaded portion 52 is defined by a cylindrical wall 58 which terminates at its rear end at an annular shoulder 60. Snugly but rotatably fitted within the cylindrical wall 58 is a nut 62 which is threaded onto the terminal portion 30. The bore 18 has a rearmost portion 64 which accommodates a rear portion of the nut 62 having a bevel gear 66 formed thereon. The abutment member 54 provides a bearing face 68 which is engageable with one side of the nut 62, while the shoulder 60 confines the nut on its rear side.

The tool holder shank 12 is provided with a transverse bore 70 extending perpendicularly to the axis of rotation of the tool and having a small pilot bore 72 at the bottom thereof. The bore 70 is so located that the bevel gear 66 projects into it for engagement with the bevel gear teeth 74 of a hand wrench 76 having a pilot extension 78 adapted to fit within the pilot bore 72. Thus, by manual rotation of the wrench 76 when inserted into the bore 70, the nut 62 may be rotated. The direction of the threads of the nut 62 and the terminal portion 30 of the tool supporting body 24 is such that the nut is drawn against the bearing surface 68 of the abutment member 54. The abutment member 54, which is held firmly in position by a set screw 80, thus limits axial movement of the nut and results in the tool cutting body being pulled rearwardly to fully and firmly seat the conical surface 38 of the dial member 32 against the conical bearing surface 22 of the tool holder. Thus, by manipulation of the wrench 76, the tool supporting body 24 may be locked in position by drawing the nut 62 down against the abutment member 54, or the nut 62 may be loosened to permit rotation of the dial member 32 for adjusting the position of the tool supporting body 24.

The design and construction of the tool locking and retaining structure heretofore described is such that the parts may be conveniently machined, a fact due largely to the successively reduced diameter of the several portions of the bore 18. In addition, the parts may be conveniently assembled by first inserting the nut 62 into the cylindrical wall 58 and thereafter threading the abutment member 54 into place and locking it in position by means of the set screw 80. The tool supporting body 24 may then be inserted into the tool holder and rotated to thread the terminal portion 30 into the nut 62 and, thus, the entire tool supporting body 24 may be conveniently removed from the tool holder for sharpening or interchange of the tools carried thereby or for presetting the adjusted position of the graduated dial 32. As illustrated herein, the tool supporting body 24 is shown as having an elongated socket 82 which is adapted to receive the shank of a milling cutter, boring bar or other cutting tool. It will, of course, be appreciated that the cutting element or elements of the tool may be mounted directly on the tool supporting body 24, or the forward portion of the tool supporting body 24 may have a variety of configurations, all within the scope of the present invention.

FIG. 3 illustrates another form of the invention in which a tool holder in the form of a boring head 84 is shown as supporting and carrying a tool supporting body in the form of a cutter cartridge 86 having a tip 83 of tungsten carbide or other metal cutting material. The cartridge 86 is externally threaded, as indicated at 90 in FIG. 4, for threaded engagement with an internally threaded and graduated dial member 92. The boring head 84 is provided with a bore 96 adapted to receive the cartridge 86 for confined sliding axial movement along the length thereof. A pair of opposed keyways 98 are formed in the bore 96 to receive key element 94 formed on the rear end of the cartridge 86 to prevent the rotation thereof. Thus, upon rotation of the graduated dial 92, the cartridge 86 will be advanced or retracted along the axis of its threads. The dial 92 has a conical bearing surface 100 which conformably seats against a conical seat 102 disposed concentrically with the bore 96 at the forward end thereof to rigidly and accurately support the cartridge 86.

A threaded bore 104 is formed in the cartridge body 86 from the rear end thereof for the reception of a locking screw 106 having a head 108. The head 108 abuts against a thrust bearing shoulder 110 formed at the rear end of the bore 96 for the purpose of drawing the conical bearing surface 100 of the dial washer down against the conical bearing seat 102 of the head 84. Disposed coaxially with the bore 96 and extending rearwardly therefrom is a slightly enlarged diameter bore 112 which opens to the rear face 114 of the boring head 84. By this means, the locking screw 106 may be assembled into position in the unit. However, the boring head is adapted to be mounted so that its rear face 114 (FIG. 3) is entirely covered by the machine spindle or other structure by which the boring head is driven. Thus, after initial assembly of the locking screw 106, the head thereof is not accessible from an axially rearward direction and, thus, a socket wrench or the like may not be inserted directly into the head of the screw for the purpose of turning the same. However, means is provided for the rotation of the screw 106 by a wrench 116 which is inserted from a direction perpendicular to the axis of the screw 106. For this purpose, a bevel gear 118 is formed on the head 108 of the screw 106, which is adapted to be engaged by a mating bevel gear 120 formed at the end of an externally cylindrical driving member 122 having a socket 124 of non-cylindrical cross section. The driving member 122 is snugly but rotatably positioned within a bore 126 having its axis perpendicular to the axis of the bore 96 and is held in position therein by means of an externally threaded locking sleeve 128 threaded into the threaded upper portion 130 of the bore 126. The locking sleeve 128 may be provided with a nylon plug 132 for the purpose of locking the same in place against accidental loosening. The wrench 116 has a shank 134 of a cross section conforming to the cross section of the socket 124 so that upon insertion therein the wrench may be rotated to effect rotation of the screw 106 through the bevel gears 120 and 118. By this means, the tool supporting body or cutter cartridge 86 may be either loosened for adjustment by rotation of the collar 92 or locked in position.

In FIG. 5, there is illustrated another boring head 136 having a blind bore 138 which is totally inaccessible from the rear even prior to mounting of the boring head in position on the machine tool by which it is driven. In this embodiment of the invention, a supplementary housing member 140 is utilized which may be secured in the bore 138 by means of cap screws 142. The housing member 140 has a bore 144 in which the rear end of a tool supporting body or cutter cartridge 146 is snugly slidable. The cutter cartridge 146 is externally threaded for the reception of an internally threaded graduated dial 148 having a conical bearing surface 150 seating against a conical bearing seat 152 formed on the housing 140 concentrically around the bore 144 and at the forward end thereof. A rear portion 154 of the cutter body 146 is formed with key elements slidable within keyways 156 formed in the bore 144 to prevent rotation of the body 146. Thus, rotation of the dial 148 will effect advancement or retraction of the cutter body 146 along its axis to adjust the position of the tip 158 of the body 146 relative to the seat 152. The mechanism for locking the dial 148 in position against the seat 152 includes a locking screw 160 threaded into the rear end of the cutter body 146 and having a head 162 abutting a thrust shoulder 164 formed on the rear of the housing member 140. The lock screw head 162 is formed with a bevel gear 166 thereon which engages a drive bevel gear 168. The bevel gear 168 is supported on a shaft 172 which is rotatably supported in a block 170 threaded onto the rear end of the housing 140 at 174. Thus, the block 170 and the housing 174 may be inserted in the bore 138 as a unitary assembly.

The tool supporting body 146 may be adjusted within the housing 140 by loosening the lock screw 160 through rotation of the drive bevel gear 168. The bevel gear 168 has a socket 176 which is arranged in alignment with an elongated bore or passageway 178 formed in the boring head 136 and extending perpendicular to the axis of the screw 160. Thus, a wrench, such as the wrench illustrated at 116 in FIG. 4, may be inserted through the passage 178 and into the socket 176 for producing rotation of the lock screw 160. To prevent the passage of dirt or other contaminants into the passage 178, the upper end thereof may be threaded as indicated at 180 for the reception of a closure plug or the like (not shown).

As may be seen from an examination of the foregoing structures, the present invention provides a means for locking a tool supporting body in position for any adjusted position of the graduated adjusting dials, yet permits loosening of the lock screw to permit rotation of the graduated dial and thus readjustment of the position of the tool supporting body within the surrounding structure. Furthermore, the tool supporting body may be removed from the tool holding structure for the rapid interchange or resharpening of tools. As will be seen, the mechanism of the present invention is also of highly precise yet rugged construction and is well adapted for use in highly accurate applications. As used herein, the expression "tool supporting body" is intended to indicate not only a cutting tool cartridge which actually carries the cutting tip or the tool supporting body illustrated in FIG. 1, but is also intended to include any bar or supporting member having or carrying directly or indirectly any cutting tool and which is supported and enclosed by a surrounding tool holder or other supporting structure. The expression "tool holder" as used herein is intended to mean any supporting structure for supporting or carrying a tool supporting body and is not necessarily limited to the boring heads or tool holder illustrated herein.

While it will be apparent that the preferred embodiments herein illustrated are well calculated to fulfill the objects above stated, it will be appreciated that the invention is susceptible to modification, variation and change without departing from the proper scope or fair meaning of the subjoined claim.

What is claimed is:

A cutting tool assembly including a tool holder having a blind bore, a housing secured in said blind bore having a seat, a tool supporting body adjustably supported in said housing and having a cutting tool projecting from said bore, a positioning member threadably engaging said tool supporting body for supportingly locating said cutting tool, means in said housing providing a thrust shoulder facing in a direction opposite from said seat, a locking member threadably engaging said tool supporting body and engageable with said thrust shoulder for drawing said positioning member against said seat, a first gear formed on said locking member about the thread axis thereof, and a second gear supported in said housing for rotation about an axis substantially perpendicular to the axis of said first gear and in engagement with said first gear, said tool holder having an opening aligned with the axis of rotation of said second gear for applying a driving tool to said second gear from a location externally of said tool.

References Cited by the Examiner
UNITED STATES PATENTS

| | | |
|---|---|---|
| 2,849,902 | 9/1958 | De Vlieg et al. |
| 3,013,450 | 12/1961 | Yogus _____ 77—58 |

FOREIGN PATENTS

| | | |
|---|---|---|
| 691,904 | 6/1940 | Germany. |

WILLIAM W. DYER, JR., *Primary Examiner.*